United States Patent
Abramovitch (10) Patent No.: US 7,321,840 B2
(45) Date of Patent: Jan. 22, 2008

(54) APPARATUS FOR MONITORING TIRE PRESSURE

(75) Inventor: Daniel Yves Abramovitch, Palo Alto, CA (US)

(73) Assignee: Avago Technologies General IP Pte. Ltd., Singapore (SG)

( * ) Notice: Subject to any disclaimer, the term of this patent is extended or adjusted under 35 U.S.C. 154(b) by 0 days.

(21) Appl. No.: 11/146,672

(22) Filed: Jun. 6, 2005

(65) Prior Publication Data

US 2006/0276990 A1    Dec. 7, 2006

(51) Int. Cl.
*G01L 17/00* (2006.01)
*G06F 15/00* (2006.01)

(52) U.S. Cl. ..................................... 702/138
(58) Field of Classification Search ............... 702/138; 73/146.3
See application file for complete search history.

(56) References Cited

U.S. PATENT DOCUMENTS 5,629,874 A * 5/1997 Mittal ..................... 702/140
2002/0075146 A1 * 6/2002 Saheki ..................... 340/447
2005/0242936 A1 * 11/2005 Watabe ..................... 340/442
2006/0010961 A1 * 1/2006 Gibson et al. ............. 73/40
2007/0038408 A1 * 2/2007 Gaunt et al. ............. 702/138

* cited by examiner

Primary Examiner—John Barlow
Assistant Examiner—Cindy D. Khuu (57) ABSTRACT

A tire monitor and a tire pressure gauge for reading the data from the tire monitor are disclosed. The tire monitor includes an in-tire controller that stores a target inflation pressure representing the pressure to which the tire should be inflated when the tire is at a standard temperature. The tire monitor transmits the target inflation pressure to the external processor when the external processor is connected to the in-tire monitor over a communication link. A sensor array in the tire monitor can provide pressure and temperature readings that are stored in the monitor and used to provide a temperature-compensated fill pressure for the tire. The tire pressure gauge provides the user with a fill pressure to be used in inflating the tire. The tire pressure gauge communicates with the tire monitor and obtains pressure and temperature readings stored in the tire monitor. These reading are used to provide the temperature-compensated fill pressure.

15 Claims, 3 Drawing Sheets

FIGURE 3

APPARATUS FOR MONITORING TIRE PRESSURE

BACKGROUND OF THE INVENTION

Improperly inflated tires have been recognized as the source of a significant number of automobile accidents. In addition, under-inflated tires have shorter lifetimes and decrease vehicle fuel efficiency. This problem has increased because of the almost universal acceptance of self-service stations for refueling vehicles and the longer periods of time between preventive maintenance service provided by newer vehicle designs and synthetic motor oils that have extended the period between oil changes. As a result, the responsibility for checking the pressure in the vehicle's tires has fallen on the driver. Unfortunately, a significant fraction of the vehicle owners and drivers fail to check the tire pressure in their vehicles until the pressure has become so low that the tire looks "flat". However, the tire can become unsafe long before it appears flat.

Even a properly inflated tire loses air at a significant rate. It is estimated that a damage-free properly inflated tire can lose air at the rate of 1 psi per month. Once the tire becomes under inflated, the rate of loss can become greater. New cars with service intervals of 5,000 to 10,000 miles are currently on the market. Hence, the period between preventive maintenance checks is sufficient to allow even a damage-free tire to lose sufficient air to become a safety hazard if the owner does not periodically check the tire and re-inflate it.

In an effort to address this serious safety problem, legislation requiring tire pressure monitoring equipment has been passed. This legislation requires the subject vehicles to have a tire pressure warning system that continuously monitors the tire pressure and warns the driver if the tire is significantly under inflated. In principle, such a low-pressure warning will cause the driver to seek out an air station and properly inflate his or her tire.

Consider a driver who starts his or her car in the morning in her garage and receives a low-pressure warning from one of these mandated systems. Assume that the under-inflated tire had only 25 psi, and the manufacturer recommends 30 psi at ambient temperatures. The typical vehicle owner does not have an air compressor in his or her garage. Hence, the driver must drive to a service station on the way to work. After the driver has driven a few miles, particularly at high speeds, the temperature of the tires on the vehicles will have substantially increased. Hence, when she arrives at the gas station, the pressure in her tires will have increased to say 28 psi. If the driver then proceeds to fill the tire to the manufacturer's suggested rating of 30 psi, the tire will still be under-inflated by about 3 psi. That is, when the tire cools to ambient once again, the tire pressure will only be about 27 psi.

This problem arises because the driver does not know the correct pressure reading to use with the gas station air hose when she inflates her heated tire. It should be noted that a difference in inflation pressure of only 4 psi is claimed to have been the difference between a safe and unsafe tire condition in the Ford Explorer tire failures blamed for a significant fraction of rollover accidents associated with these vehicles.

The above description also assumes that the driver knows the correct pressure for each of the tires when the tires are cold. The currently mandated pressure warning system merely informs the driver that the tire pressures is significantly below the desired level by lighting an appropriate light on the car's instrument console. It is up to the driver to know correct pressure with which to inflate each of the tires. The warning light only provides an indication of a dangerously low tire pressure, not the optimum tire pressure. In this regard, it should be noted that the optimum pressure is typically different for the front and rear tires. The correct values are listed in the vehicles owner's manual or on decals on the body of the vehicle. However, this manual or the decals are often missing, particularly in older vehicles. In addition, the correct inflation pressure is tire dependent; thus if the original equipment tires are replaced by different tires, the values can be in error.

Finally, the above scenario assumes that the driver is competent to use the service station air station to fill the tire to the correct level and that the service station air station has a gauge that is accurate. The air hoses in most service stations have an air gauge that consists of a piston that is forced against a spring such that a tab having pressure markings extends from a housing. The user reads the highest pressure marking that is visible on the gauge when the air hose is pushed against the valve stem of the tire. The user fills the tire by depressing a trigger that actuates a valve that connects the hose to the pressure reservoir. During the filling process, the gauge does not provide an accurate reading of the pressure in the tire; hence the filling process is an iterative process in which the user adds air, measures the pressure, adds air, etc until the correct pressure appears on the gauge or the tire is over-inflated. If the tire is over-inflated, the user then uses the end of the hose to bleed air from the tire until the correct pressure reading is seen on the gauge.

The gauges are mechanical devices that have a significant amount of backlash. In addition, any dirt or debris that accumulates on the piston increases this backlash, and hence, makes an accurate reading difficult. Hence, significant errors can still be present even when the driver takes the time to fill the tires to the manufacturer's specification.

SUMMARY OF THE INVENTION

The present invention includes a tire monitor and a gauge for reading the data from the tire monitor. The tire monitor includes an in-tire controller that stores a target inflation pressure representing the pressure to which the tire should be inflated when the tire is at a standard temperature. The tire monitor also includes a communication link for coupling the in-tire controller to a processor external to the tire. The tire monitor transmits the target inflation pressure to the external processor when the external processor is connected to the in-tire monitor. In another aspect of the present invention, the tire monitor also includes a sensor array having a pressure sensor and a temperature sensor mounted in the tire. The tire monitor also includes a memory that stores sensor readings including the pressure and temperature values generated by the pressure sensor and temperature sensor, respectively. The tire monitor causes the temperature and pressure values to be stored in the memory. The tire monitor transmits the stored pressure and temperature readings to the external processor. In one embodiment, the tire monitor also includes a motion sensor for generating a motion signal when the tire is moving. In one embodiment, a motion value generated from the motion signal is stored in the memory when the temperature and pressure values are stored in the memory. In another embodiment, the pressure and temperature values are not stored in the memory when the motion signal is present. In one embodiment, the communication link can include conductors in a valve stem assembly used for inflating the tire or be a wireless link. In one embodiment, the tire monitor has physical dimensions that allow the monitor to be inserted in the tire through a valve stem used for inflating the tire.

A tire pressure gauge according to the present invention includes a communication link for communicating with an in-tire monitor on a tire to be filled. The in-tire monitor stores a target inflation pressure that is communicated to the tire pressure gauge on the communication link. The tire gauge includes a gauge controller for causing the in-tire monitor to communicate the target inflation pressure to the tire gauge; and a display for displaying a fill pressure for the tire that depends on the target inflation pressure. In one embodiment, the in-tire monitor communicates a temperature reading for the tire and the fill pressure represents an estimate of the pressure needed in the tire such that the tire will be at the target inflation pressure when the tire is at a standard temperature. In one embodiment, the tire gauge utilizes a calibration curve that assumes that the tire has a constant volume independent of temperature and pressure changes to arrive at the displayed fill pressure. In another embodiment, the in-tire monitor provides a plurality of temperature and pressure values for the tire, and the tire gauge utilizes the temperature and pressure values to arrive at the displayed fill pressure. In one embodiment, the tire gauge generates a tire leak message on the display if the temperature and pressure values indicate that the tire has lost air at a rate greater than a threshold rate during a time period in which the temperature and pressure values were measured. In one embodiment, the communication link includes conductors that are part of a valve stem assembly used to inflate the tire. In one embodiment, information in the in-tire monitor is communicated to the gauge over the communication link when the gauge is brought into contact with the valve stem assembly. In one embodiment, the tire gauge includes an air hose connection for connecting the gauge to an air hose having compressed air therein. In this embodiment, the tire gauge also includes a fill valve controlled by the gauge controller and connected to the air hose connection and a tire connector connected to the fill valve for connecting the air hose to a valve stem assembly on the tire. A manually operated fill input generates a signal indicating that the tire is to be inflated when actuated. In one embodiment, the gauge controller causes the fill valve to be operated to fill the tire to the fill pressure when the gauge controller detects an in-tire monitor on the communication link and a fill signal is present. In one embodiment, the gauge controller connects the tire connector to the air hose as long as the fill input is present if the gauge controller does not detect an in-tire monitor in the tire.

DETAILED DESCRIPTION OF THE PREFERRED EMBODIMENTS OF THE INVENTION

The present invention is based on the observation that the driver needs to be provided with a target tire pressure to be used when filling the tires without the driver having to look up the appropriate pressure or correct the pressure for the temperature of the tire. The manner in which the present invention provides its advantages can be more easily understood with reference to FIG. 1, which illustrates a tire pressure measuring system according to one embodiment of the present invention. In this embodiment, an in-tire processor 30 is inserted into the tire through a valve stem 22 that is used in place of the usual valve. Valve stem 22 can be mounted in the wheel 23 by any suitable mechanism.

Figure 1:
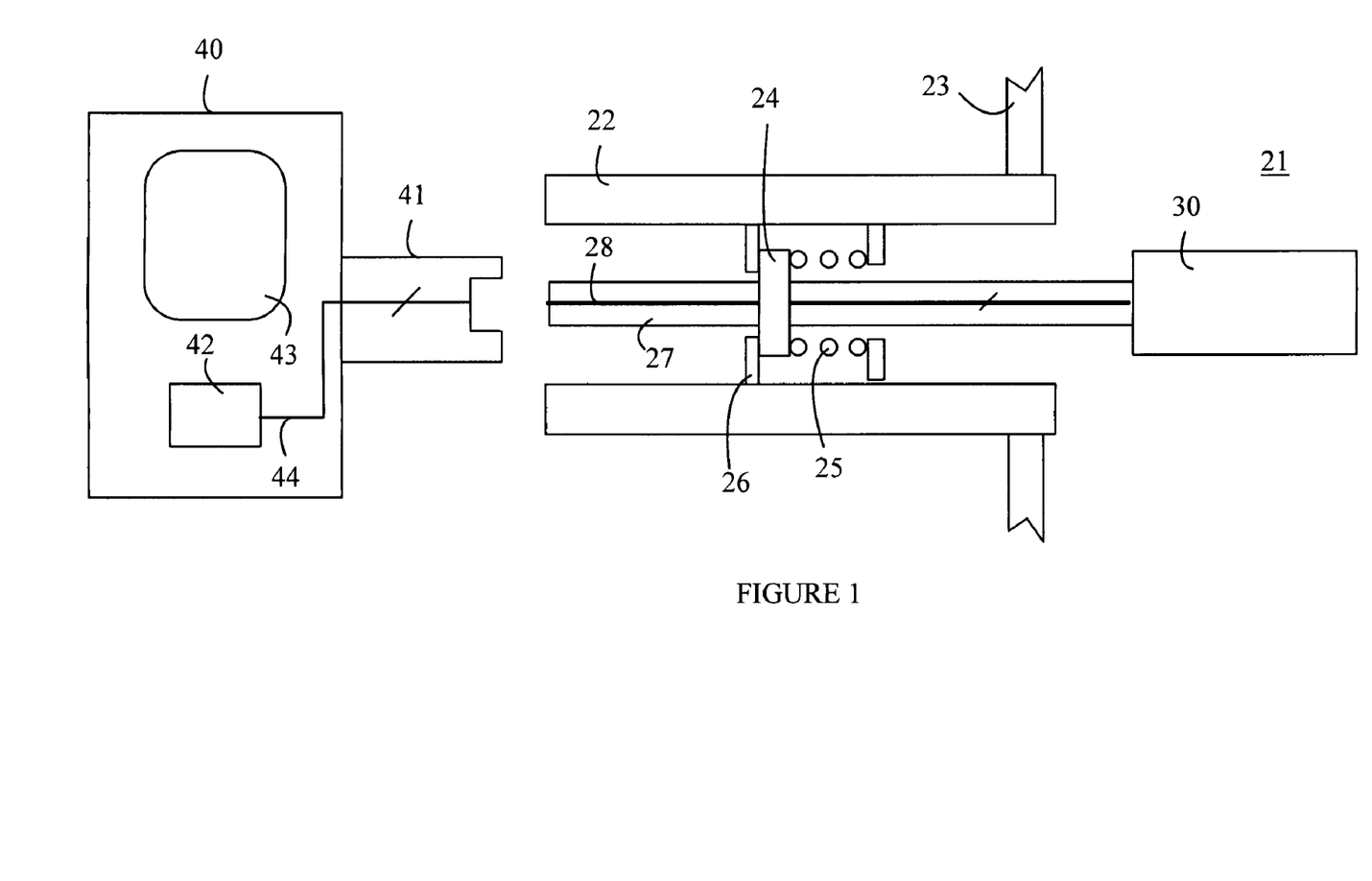
FIG. 1 illustrates a tire pressure measuring system according to one embodiment of the present invention.

Valve stem 22 includes a seal 24 that is forced against a valve seat 26 by spring 25. When rod 27 is subjected to a sufficient force to overcome the force of spring 25 and the air pressure in the tire interior 21, seal 24 moves toward the interior tire and opens a passage to the interior through which air can pass. A mechanical force applied to the end of rod 27 can provide the force.

In-tire processor 30 is attached to rod 27 and communicates with a special tire gauge 40 through a bus 28 associated with rod 27. In this embodiment, bus 28 has at least two wires. Tire gauge 40 includes a fitting 41 that has a connector that connects bus 28 to a controller 42 within tire gauge 40 by a bus 44. Tire gauge 40 also includes a display 43 that is used to communicate instructions and a fill pressure reading to the user.

In one embodiment of the present invention, fitting 41 moves into the body of gauge 40 against a spring when a force is applied to the end of fitting 41 by pressing fitting 41 against rod 27. The spring in question has a spring constant that is less than that of spring 25. Hence, when gauge 40 is pressed against valve stem 22, fitting 41 is forced against rod 27 with a force that is sufficient to make an electrical connection between bus 28 and bus 44. However, the spring constants are chosen such that fitting 41 will not engage rod 27 with a force that is sufficient to move rod 27 and break the seal between the inside and outside of the tire.

Figure 2:
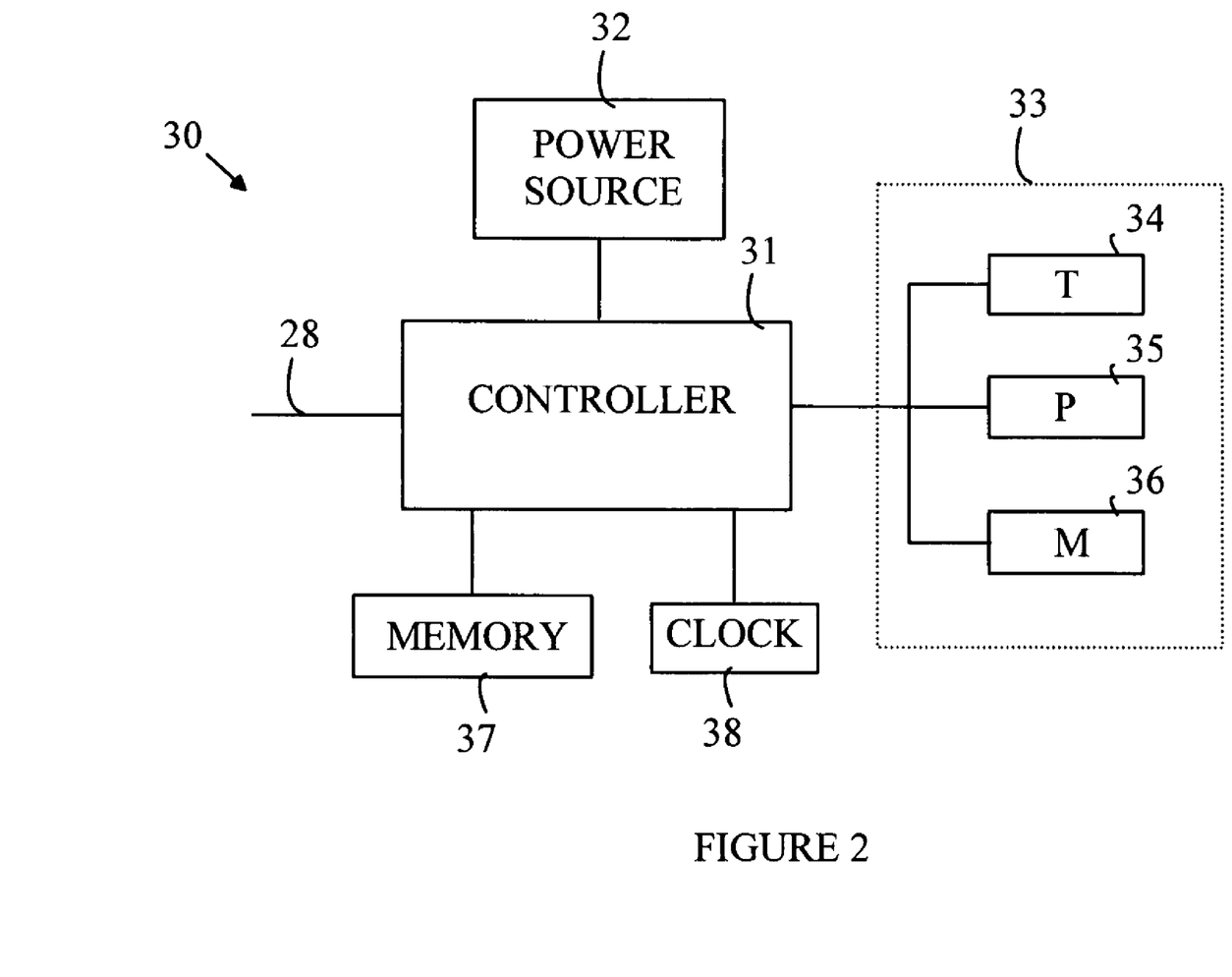
FIG. 2 is a block diagram of an in-tire processor according to one embodiment of the present invention.

Refer now to FIG. 2, which is a block diagram of an in-tire processor according to one embodiment of the present invention. In-tire processor 30 includes a sensor array 33 that is connected to a controller 31 that records sensor readings. The sensors are read at periodic intervals that are governed by a clock 38. The readings are stored in a memory 37, which is preferably a non-volatile memory. The controller and sensors are powered by an internal power source 32 that typically includes a battery. It should be noted that the battery could be a rechargeable battery that is recharged when in-tire processor 30 is connected to tire gauge 40. Power source 32 can also include a mechanism that generates electricity from the rotation of the tire when the vehicle is moving.

In one embodiment, sensor array 33 includes a temperature sensor 34 and a pressure sensor 35. In addition, as will be explained in more detail below, sensor array 33 optionally includes a motion detector 36. However, embodiments that include only a temperature sensor or a pressure sensor can be constructed and still provide significant advantages.

Controller 31 is programmed with a target pressure and temperature when the tire is mounted on the vehicle. The programming can be provided as one of the functions in a tire gauge similar to tire gauge 40 at the tire replacement center. The target pressure is the pressure to which the tire should be inflated when the tire is at a standard temperature. The standard temperature can be provided at the time the controller is programmed or the standard pressure can be an industry standard, thereby making the storage of this information unnecessary.

The stored target pressure takes into account the position of the tire on the car, since tires on the front of a vehicle are usually filled to a different pressure than tires on the back of the vehicle. When the tires are rotated, the processor is reprogrammed to reflect the target pressure for the new tire location.

The target pressure represents the pressure to which the tire should be filled when the tire is at the standard temperature, typically, the ambient temperature. In its simplest mode of operation, the present invention provides the user with the target inflation pressure on screen 43. This eliminates errors in looking up the correct inflation pressure in a manual that may be out of date because the original tires are no longer on the vehicle. However, this mode still requires the user to use an external pressure gauge while filling the tire.

In the next simplest embodiment, the invention also provides the current inflation pressure on screen 43 utilizing a sensor in the tire. This simple embodiment provides the additional benefit of providing a more accurate pressure reading than that available from the typical service station fill hose. It should be noted that the pressure sensor in the tire can be calibrated at the factory and is protected from the elements. Hence, the pressure measurements are expected to be more accurate than those obtained using the typical service station air gauge.

However, as pointed out above, the temperature of the tire increases as the tire is driven. Hence, in one embodiment of the present invention, the fill pressure provided to the driver is corrected for the temperature differential. In this embodiment, the processor also includes temperature sensor 34 that measures the temperature of the air in the tire.

For the purposes of this discussion, the "temperature-corrected fill pressure" is defined to be the gauge pressure to which the heated tire must be filled such that the tire will be at the target inflation pressure when the tire is again at the standard temperature. The temperature-corrected fill pressure can be computed by the processor in the tire or by the gauge that is attached to the processor through the connections in the valve stem.

The relationship between the tire volume, pressure, and temperature is given by the well known relationship $PV=cT$, where P is the pressure in the tire, V is the volume of the air in the tire, T is the absolute temperature, and c is a constant. Hence, if the tire could be modeled as a rigid structure having a constant volume, then the pressure in the tire would increase linearly with the absolute temperature of the tire, and the temperature-corrected fill pressure could be obtained from a simple linear calibration curve. In the simplest temperature-corrected embodiment of the present invention, a linear calibration curve is used to provide the temperature-corrected fill pressure.

Unfortunately, the volume of the tire changes both with temperature, pressure, and vehicle loading. Hence, this simple embodiment, while providing a better target fill pressure than embodiments that lack any temperature correction, does not provide the most accurate temperature-corrected fill pressure.

The problem of determining V as a function of temperature is complicated by a number of factors. First, the tire is not a rigid structure. For any given vehicle load, the tire is flatter in the region in which the tire makes contact with the ground. As the pressure in the tire is reduced, the shape of the tire in this region changes, and hence, the volume of air also changes. Similarly, as weight is added to the vehicle, the tire becomes flatter in this region, and hence, the volume also changes. Finally, as the temperature of the tire increases, the tire can become more pliable, and hence, expand with a resulting increase in the volume of the tire. The amount of this expansion is related to the material and the design of the tire, and hence, is not easily predictable. Furthermore, the relationship may change over the life of the tire, since old worn tires are more likely to expand with temperature and pressure than a new, more rigid, tire.

In one embodiment of the present invention, the pressure sensor is also used to record pressure readings at a number of temperatures within the tire. In this embodiment, the in-tire processor stores data that can be used to generate a calibration curve that relates pressure to temperature from measurements made at different temperatures during the operation of the vehicle. This data is recorded in memory 37 discussed above with reference to FIG. 2. When the tire gauge is connected to the controller 31, the data is read and used to generate a calibration curve. In one embodiment, the pressure and temperature readings are taken at regular intervals using clock 38 to define the sampling times.

Consider the case in which the tire starts out from a cold state and then heats up as the vehicle is driven. The set of measurements starting from the cold state through the highest temperature state forms a calibration curve that can be used to relate pressure and temperature. In general, the memory of the in-tire processor will have a large number of such calibration curves. The data may be viewed as a three dimensional graph in which the axes are temperature, pressure, and time. If the tire does not have a significant leak, all of the calibration curves should go through the same pressure at the standard temperature over a period of several days or weeks depending on the rate of air loss associated with the tire. If the tire is correctly inflated, this pressure will be the target pressure. Hence, if one averages all of the pressure readings taken in some predetermined period of time at each temperature, an averaged calibration curve will be obtained.

The calibration curves can be viewed as a family of curves in which each member of the family is labeled by the pressure in the tire at the standard temperature. When the driver checks the tire pressure with gauge 40 shown in FIG. 1, controller 42 in the gauge reads the data stored in the in-tire processor and the current pressure in the tire. Controller 42 then constructs an appropriate calibration curve. From the calibration curve, controller 42 determines the pressure that would be in the tire at the standard temperature. If this pressure is below the target inflation temperature, controller 42 determines the pressure to which the tire must be inflated at the current temperature in the tire to provide the target inflation pressure when the tire cools back down to the standard temperature.

If all of the calibration curves in the family of curves are parallel to one another, then controller 42 only needs to look at the current calibration curve and determine the offset from the target inflation pressure at the standard temperature. The controller 42 then adds this offset to the current tire pressure and displays that value as the pressure to which the tire is to be inflated.

If the calibration curves in the family of curves are not parallel to one another, then the controller 42 must examine the stored data to find the latest data for the calibration curve that passes through the standard temperature and pressure. This will correspond to the measurement stored after the tire was last inflated to the correct pressure and heated to the current in-tire temperature. Controller 42 then reads the pressure on this calibration corresponding to the current tire temperature, and outputs that value as the pressure to which the tire is to be inflated.

It should be noted that the pressure in the tire while the vehicle is moving is subject to significant fluctuations. As the tire hits a bump in the road, the pressure increases and then decreases. Acceleration and turning also cause the tire to change shape, and hence, alter the pressure in the tire. If the time average of these fluctuations is zero, the effects will be averaged out if sufficient temperature and pressure readings are taken.

Alternatively, the sensor array in the in-tire processor can include a motion sensor such as motion sensor 36 shown in FIG. 2. In one embodiment, controller 31 is inhibited from taking pressure and temperature readings while the car is moving. Since the tires cool down relatively slowly after being driven at high speeds, the temperature will still be elevated when the car stops. Hence, this strategy still allows the in-tire processor to collect temperature and pressure data at elevated temperatures without dealing with noise introduced by the motion of the tire over the road. Alternatively, controller 31 can merely record the motion sensor output with the outputs from the temperature and pressure sensors and store all three values in memory 37. Controller 42 in the gauge can then sort the measurements in the process of determining the correct inflation pressure.

As noted above, the temperature, time, and pressure data points can be viewed as a three-dimensional graph. The pressure versus temperature calibration curves represent the averaging of the data points over relatively short time intervals. However, useful information can also be obtained by plotting the pressure in the tire at some predetermined temperature as a function of time. For example, the data points for times between t-Dt and t+Dt can be used to compute a calibration curve $P_t(T)$, where Dt is some predetermined time interval about time t and T is the measured temperature. These values are the pressure that would be measured in the tire when the tire is at some predetermined temperature, $T_0$, at each time t. The values $P_t(T_0)$ can then be plotted as a function of t or fitted to some predetermined curve.

The slope of this curve represents the rate at which the tire lost air over the time period covered by the stored data. As noted above, even a new properly inflated tire losses air at a non-zero rate. Hence the curve will, in general, have a negative slope. If the slope is more negative than some threshold value, the tire may have a more significant leak. For example, the tire could have an imbedded nail resulting in a slow leak.

It should be noted that merely measuring the tire pressure when the car is filled at the service station may not detect such a leak, since the individual measurements have "noise" that can be as much as the pressure loss over a few days, particularly when the measurements are made at different temperatures and with different pressure gauges. However, by examining these more extensive measurements taken with the same pressure sensor and correcting the measurements for temperature fluctuations, such small leaks can be detected and brought to the driver's attention before the nail is dislodged and the tire goes flat.

It should be noted that gauge 40 communicates with controller 31 in the in-tire processor through a communication link that does not require that the seal between the inside and outside of the tire be broken. In conventional tire pressure gauges, this seal must be broken to measure the air pressure in the tire. If the person making the measurement is not careful, a significant amount of air can leak out of the tire in this process, since some manual dexterity is required to hold the gauge against the valve stem while the pressure is being measured. Furthermore, if the seal around the air hose to tire connection is worn, air will be lost independent of the skill of the operator. The present invention eliminates this source of air loss.

The above-described embodiments of the present invention utilize a data bus that passes through the valve stem to connect the in-tire processor and gauge. However, embodiments in which a wireless communication link is used can also be constructed. Since such communication links are well known in the art, they will not be discussed in detail here. For the purposes of this discussion it is sufficient to note that such a link allows the gauge to be used at a location that is remote from the tire.

It should also be noted that the gauge function could be incorporated in the vehicle's onboard computer in embodiments that utilize a wireless link. Such embodiments have the advantage of being able to monitor for slow leaks in a continuous manner.

Figure 3:
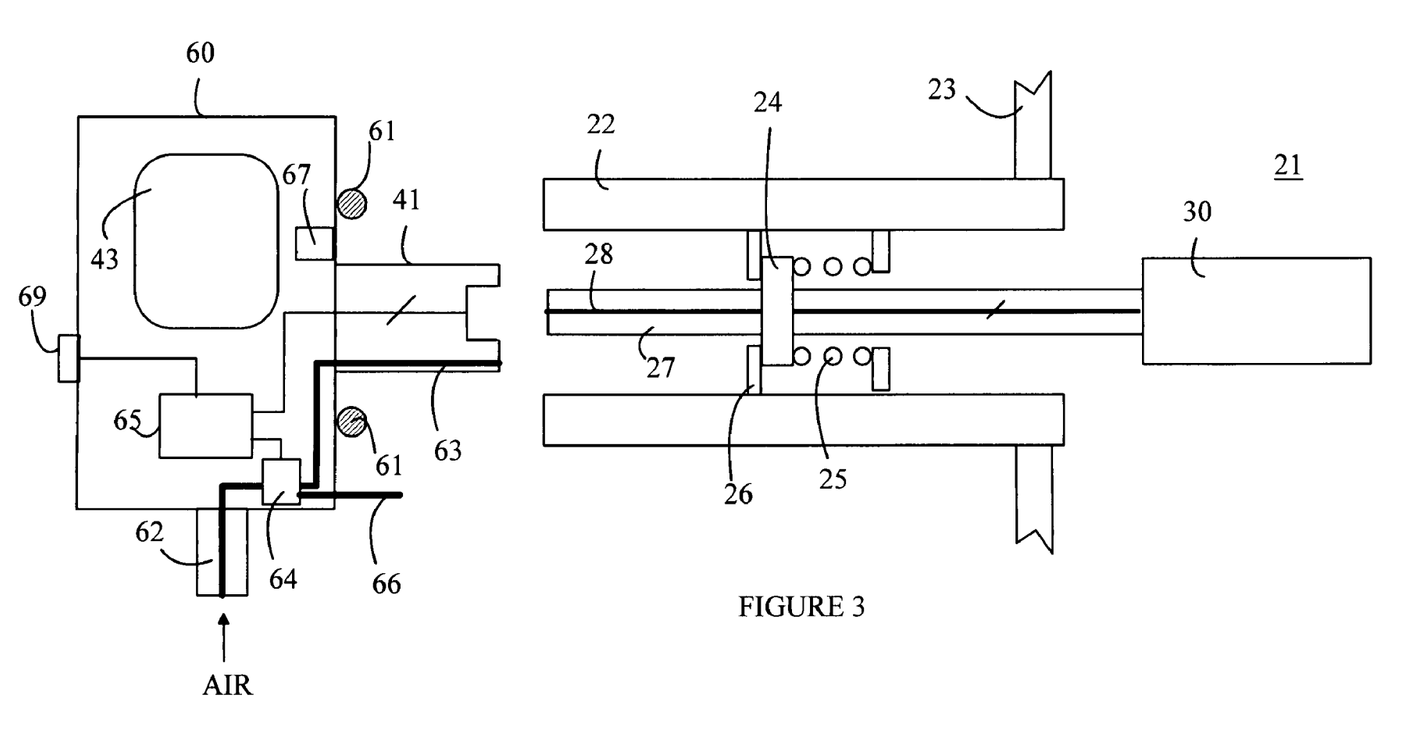
FIG. 3 illustrates a fill system according to another embodiment of the present invention.

While the above-described embodiments of the gauge merely provide a pressure value and other information to the user, embodiments in which the gauge also controls an air supply and fills the tire to the desired pressure can also be constructed. Refer now to FIG. 3, which illustrates a fill system according to another embodiment of the present invention. To simplify the following discussion, the elements shown in FIG. 3 that serve functions analogous to those discussed above with reference to FIG. 1 have been given the same numeric designations and will not be discussed further here.

The in-tire processor in the system shown in FIG. 3 is essentially the same as that discussed above with reference to FIG. 1; however the tire gauge has been modified to include a connector 62 for attaching the gauge to a standard air hose. Gauge 60 also includes a sealing ring 61 that allows the gauge to be sealed against valve stem 22. When so sealed, adapter 41 makes contact with rod 27 as discussed above and, in addition, depresses rod 27 to provide an open passage that communicates with the inside of the tire. Gauge 60 also includes an air passage 63 that connects the airline at connector 62 to an opening that communicates with the interior of valve stem 22. This connection is controlled via a valve 64 in gauge 60. Controller 65 controls valve 64.

If controller 65 senses an in-tire processor according to the present invention when adapter 41 engages the end of rod 27, then controller 65 determines the correct inflation pressure and adds or removes air from the tire. Controller 65 also communicates with the user on screen 43 to inform the user of its actions and of any leaks that have been detected. It should be noted that in embodiments in which controller 65 controls valve 64 to remove air from an over-inflated tire, valve 64 also includes a setting that connects channel 63 to the outside environment via channel 66 to dispose of the excess air.

If, on the other hand, controller 65 does not detect an in-tire processor according to the present invention, controller 65 operates valve 64 to simulate a conventional air fill hose with the pressure detected in channel 63 being measured by a pressure sensor that is part of valve 64. Alternatively, the pressure sensor can be directly attached as a separate unit 67 that communicates with the interior of valve stem 22. To better simulate a conventional fill hose, gauge 60 can include a push button 69 that the user depresses to signal controller 65 to apply pressure to the tire.

The above-described embodiments utilize a particular algorithm for obtaining the correct fill pressure from the three-dimensional data collected by the in-tire sensor. However, other algorithms that fit the three-dimensional surface to a more complex model can be utilized.

The embodiments of the present invention described above store the target inflation pressure in a controller in the tire. Such embodiments have the advantage of keeping the target inflation pressure with the tire such that when the tire is changed, the new target inflation pressure can be programmed by a technician that has an appropriate pressure gauge or other programming device. Such a system functions both on existing vehicles and can function on more advanced vehicle designs that include pressure monitors in the tires. However, embodiments of the present invention in which the target inflation pressure for each tire is stored in the vehicle's computer can also be constructed.

Various modifications to the present invention will become apparent to those skilled in the art from the foregoing description and accompanying drawings. Accordingly, the present invention is to be limited solely by the scope of the following claims.

What is claimed is:

1. A tire monitor comprising
an in-tire controller that stores a target inflation pressure representing the pressure to which said tire should be inflated when said tire is at a standard temperature; and
a communication link for coupling said in-tire controller to a processor external to said tire,
wherein said in-tire controller transmits said target inflation pressure to said external processor when said external processor is connected to said in-tire controller;
a sensor array comprising a pressure sensor and a temperature sensor mounted in said tire; and
a memory that stores sensor readings including said pressure and temperature values generated by said pressure sensor and temperature sensor, respectively,
wherein said in-tire controller causes said temperature and pressure values to be stored in said memory and wherein said in-tire controller transmits said stored pressure and temperature readings to said external processor; and
a motion sensor for generating a motion signal when said tire is moving.

2. A tire monitor comprising
an in-tire controller that stores a target inflation pressure representing the pressure to which said tire should be inflated when said tire is at a standard temperature; and
a communication link for coupling said in-tire controller to a processor external to said tire,
wherein said in-tire controller transmits said target inflation pressure to said external processor when said external processor is connected to said in-tire controller;
a sensor array comprising a pressure sensor and a temperature sensor mounted in said tire; and
a memory that stores sensor readings including said pressure and temperature values generated by said pressure sensor and temperature sensor, respectively,
wherein said in-tire controller causes said temperature and pressure values to be stored in said memory and wherein said in-tire controller transmits said stored pressure and temperature readings to said external processor; and
a motion sensor for generating a motion signal when said tire is moving, and
wherein a motion value generated from said motion signal is stored in said memory when said temperature and pressure values are stored in said memory.

3. A tire monitor comprising
an in-tire controller that stores a target inflation pressure representing the pressure to which said tire should be inflated when said tire is at a standard temperature; and
a communication link for coupling said in-tire controller to a processor external to said tire,
wherein said in-tire controller transmits said target inflation pressure to said external processor when said external processor is connected to said in-tire controller;
a sensor array comprising a pressure sensor and a temperature sensor mounted in said tire; and
a memory that stores sensor readings including said pressure and temperature values generated by said pressure sensor and temperature sensor, respectively,
wherein said in-tire controller causes said temperature and pressure values to be stored in said memory and wherein said in-tire controller transmits said stored pressure and temperature readings to said external processor; and
a motion sensor for generating a motion signal when said tire is moving, and
wherein said pressure and temperature values are not stored in said memory when said motion signal is present.

4. A tire monitor comprising
an in-tire controller that stores a target inflation pressure representing the pressure to which said tire should be inflated when said tire is at a standard temperature; and
a communication link for coupling said in-tire controller to a processor external to said tire,
wherein said in-tire controller transmits said target inflation pressure to said external processor when said external processor is connected to said in-tire controller, and
wherein said communication link comprises conductors in a valve stem assembly used for inflating said tire, said conductors making physical contact with corresponding conductors in said external processor.

5. A tire monitor comprising
an in-tire controller that stores a target inflation pressure representing the pressure to which said tire should be inflated when said tire is at a standard temperature; and
a communication link for coupling said in-tire controller to a processor external to said tire,
wherein said in-tire controller transmits said target inflation pressure to said external processor when said external processor is connected to said in-tire controller, and
wherein said tire monitor has physical dimensions that allow said monitor to be inserted in said tire through a valve stem used for inflating said tire.

6. A method for providing a fill pressure for a tire mounted on a vehicle, said method comprising:
providing a controller that stores a target inflation pressure representing the pressure to which said tire should be inflated when said tire is at a standard temperature;
reading said target inflation pressure with a tire pressure gauge that is exterior to said tire; and
inflating said tire to a fill pressure that depends on said target inflation pressure.

7. The method of claim 6 wherein said controller is located in said tire.

8. The method of claim 6 further comprising measuring a temperature value for air in said tire, wherein said fill pressure also depends on said temperature value.

9. The method of claim 6 further comprising
measuring a plurality of temperature and pressure readings for air in said tire during the operation of said vehicle;

storing said measured temperature and pressure readings; and utilizing said stored temperature and pressure readings to provide a relationship between temperature and pressure for air in said tire, wherein said fill pressure depends on said relationship.

10. The method of claim 9 wherein said measured temperature and pressure readings are stored in a device located in said tire.

11. The method of claim 9 wherein said vehicle comprises a data processing system and wherein said measured temperature and pressure readings are stored in said data processing system.

12. The method of claim 9 further comprising utilizing said stored temperature and pressure readings to detect a leak in said tire.

13. The method of claim 6 further comprising connecting said tire to an air delivery system that determines said fill pressure and automatically inflates said tire to said fill pressure.

14. A method for providing a fill pressure for a tire mounted on a vehicle, said method comprising:

provi­ding a controller that stores a target inflation pressure representing the pressure to which said tire should be inflated when said tire is at a standard temperature;

reading said target inflation pressure with a tire pressure gauge that is exterior to said tire;

inflating said tire to a fill pressure that depends on said target inflation pressure;

measuring a plurality of temperature and pressure readings for air in said tire during the operation of said vehicle;

storing said measured temperature and pressure readings; and utilizing said stored temperature and pressure readings to provide a relationship between temperature and pressure for air in said tire, wherein said fill pressure depends on said relationship; and determining if said vehicle is moving when each of said temperature and pressure readings is measured.

15. A method for providing a fill pressure for a tire mounted on a vehicle, said method comprising:

providing a controller that stores a target inflation pressure representing the pressure to which said tire should be inflated when said tire is at a standard temperature;

reading said target inflation pressure with a tire pressure gauge that is exterior to said tire;

inflating said tire to a fill pressure that depends on said target inflation pressure;

measuring a plurality of temperature and pressure readings for air in said tire during the operation of said vehicle;

storing said measured temperature pressure readings; and utilizing said stored temperature and pressure readings to provide a relationship between temperature and pressure for air in said tire, wherein said fill pressure depends on said relationship; and wherein said relationship is determined only from those temperature and pressure readings that were measured when said vehicle was not moving.

* * * * *

UNITED STATES PATENT AND TRADEMARK OFFICE
CERTIFICATE OF CORRECTION

| | | |
|---|---|---|
| PATENT NO. | : 7,321,840 B2 | Page 1 of 1 |
| APPLICATION NO. | : 11/146672 | |
| DATED | : January 22, 2008 | |
| INVENTOR(S) | : Daniel Yves Abramovitch | |

It is certified that error appears in the above-identified patent and that said Letters Patent is hereby corrected as shown below:

First Page, Column 1, Title, before "APPARATUS" insert -- METHOD AND --; and

Column 12, Line 22, Claim 15, after "temperature" insert -- and --.

Signed and Sealed this

Twenty-second Day of March, 2011

David J. Kappos
*Director of the United States Patent and Trademark Office*

UNITED STATES PATENT AND TRADEMARK OFFICE
CERTIFICATE OF CORRECTION

PATENT NO.        : 7,321,840 B2                      Page 1 of 1
APPLICATION NO.   : 11/146672
DATED             : January 22, 2008
INVENTOR(S)       : Daniel Yves Abramovitch It is certified that error appears in the above-identified patent and that said Letters Patent is hereby corrected as shown below:

Title Page, Item (54) and at Column 1, line 1, Title, before "APPARATUS" insert -- METHOD AND --; and Column 12, Line 22, Claim 15, after "temperature" insert -- and --.

This certificate supersedes the Certificate of Correction issued March 22, 2011.

Signed and Sealed this
Twenty-sixth Day of April, 2011

David J. Kappos
*Director of the United States Patent and Trademark Office*